Jan. 5, 1937.  E. T. PARSONS  2,066,899
DOUGH PIECE CONTROLLED FLOUR DUSTING MECHANISM
Filed April 10, 1936  4 Sheets-Sheet 3

INVENTOR
Edward T. Parsons,
BY
Harry B. Rook,
ATTORNEY

Jan. 5, 1937.  E. T. PARSONS  2,066,899
DOUGH PIECE CONTROLLED FLOUR DUSTING MECHANISM
Filed April 10, 1936  4 Sheets-Sheet 4
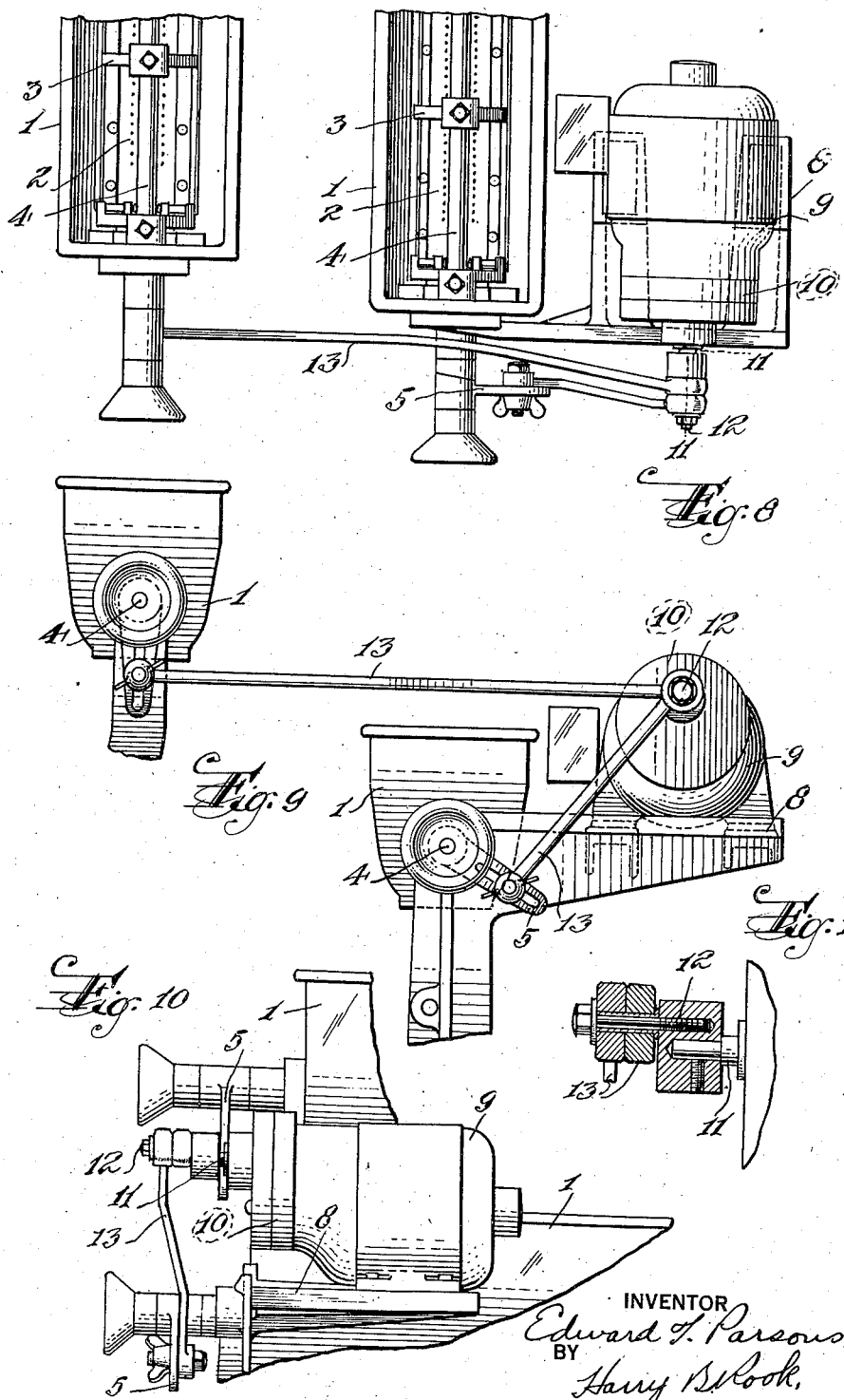
INVENTOR
Edward T. Parsons,
BY
Harry B. Cook,
ATTORNEY Patented Jan. 5, 1937

2,066,899

UNITED STATES PATENT OFFICE 2,066,899

DOUGH-PIECE CONTROLLED FLOUR DUSTING MECHANISM

Edward T. Parsons, Upper Montclair, N. J., assignor to Thomson Machine Company, Belleville, N. J., a corporation of New Jersey Application April 10, 1936, Serial No. 73,677

12 Claims. (Cl. 107—7)

This invention relates particularly to dough working machinery and especially to mechanism for dusting flour on the surfaces of the machinery which contact with the dough during working thereof so as to form a skin on the dough and prevent sticking of the dough on such surfaces.

However, the invention is applicable to other uses where pieces of material to be operated upon are caused to move along a predetermined path at some point in which additional material is supplied for further treatment, and the control of the supply of such additional material is effected by the piece as it moves along said path.

In dough working machinery, particularly in dough molding machines, lumps of dough are passed between sheeting rollers and then rolled to a spiral roll which is molded between two molding surfaces such as a drum and a pressure plate, and it is customary to sift flour onto the surfaces of the sheeting rollers and the drum constantly during operation of the machine, even when no lumps of dough are passing through the machine. Inasmuch as only a small amount of flour is required on the sheeting rollers and molding surfaces and is necessary only when a lump of dough is to pass over the surfaces, the continuous operation of the dusting mechanism results in waste of flour, clogging of the rollers with the surplus flour, and also unnecessary wear on the parts of the dusting mechanism.

One object of my invention is to provide a novel and improved machine of the general character described wherein the dusting mechanism or the means for supplying the additional material, is controlled by means actuated by a piece of material, for example a lump of dough, moving along a predetermined path in advance of the dusting mechanism or other means for supplying material for further treatment of the piece, whereby the dusting mechanism will be operated intermittently and only when a piece of dough is passing through the machine in advance of the dusting mechanism.

Another object is to provide in a dough working machine of the character described, novel and improved automatic means for successively starting and stopping the dusting mechanism as each lump of dough passes a predetermined point in advance of the dough working surfaces, such as the sheeting rollers or molding drum.

Other objects are to provide novel and improved electric switch mechanism actuated by each of the lumps of dough as they pass a predetermined point, in combination with an electrically operated means such as an electric motor operated dusting mechanism, whereby the switch controls starting and stopping of the electrically operated mechanism as each piece passes said predetermined point; to provide in a machine of the character described novel and improved means for actuating an electric switch adapted to be momentarily engaged by each lump or piece for opening and closing the switch; and to obtain other advantages and results as will be brought out by the following description.

For the purpose of illustrating the principles of the invention, I have shown it in connection with a dough molding machine of the general character shown in Patent No. 701,646, and a flour duster of the general type show in Patent No. 1,548,379 dated August 4, 1925. Also, I have shown a dough feeding mechanism of the general type disclosed in my Patent No. 1,801,286 dated April 21, 1931 for feeding lumps of dough to the molding machine. However, it should be understood that the invention is susceptible of use in other machines for different purposes and in connection with other dough molding machines, flour dusters and the like.

Referring to the accompanying drawings in which corresponding and like parts are designated throughout the several views by the same reference characters Figure 1 is a side elevation of a dough-piece controlled flour dusting mechanism embodying my invention.

Figure 5 is a longitudinal sectional view on the line 5—5 of Figure 3.

Figure 6 is a side elevation of the electric switch.

Figure 7 is a wiring diagram showing the circuit controlled by the switch.

Figure 8 is a plan view of the dusting mechanism shown in Figure 1 with portions broken away.

Figure 9 is a side elevation thereof.

Figure 10 is a front elevation of the dusting mechanism from line 10—10 of Figure 1 with portions broken away, and Figure 11 is an enlarged fragmentary sectional view on the line 11—11 of Figure 8.

Figure 1:
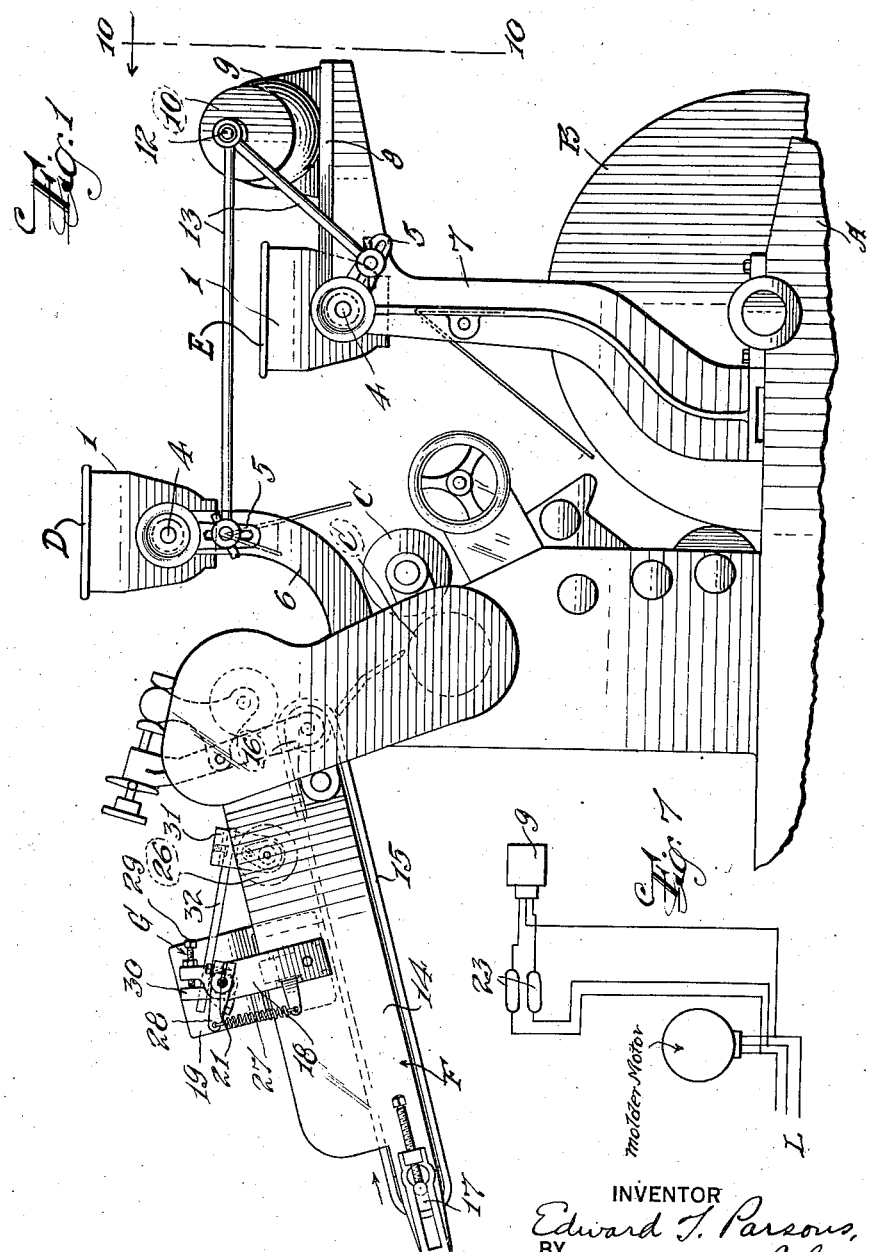
Figure 2:
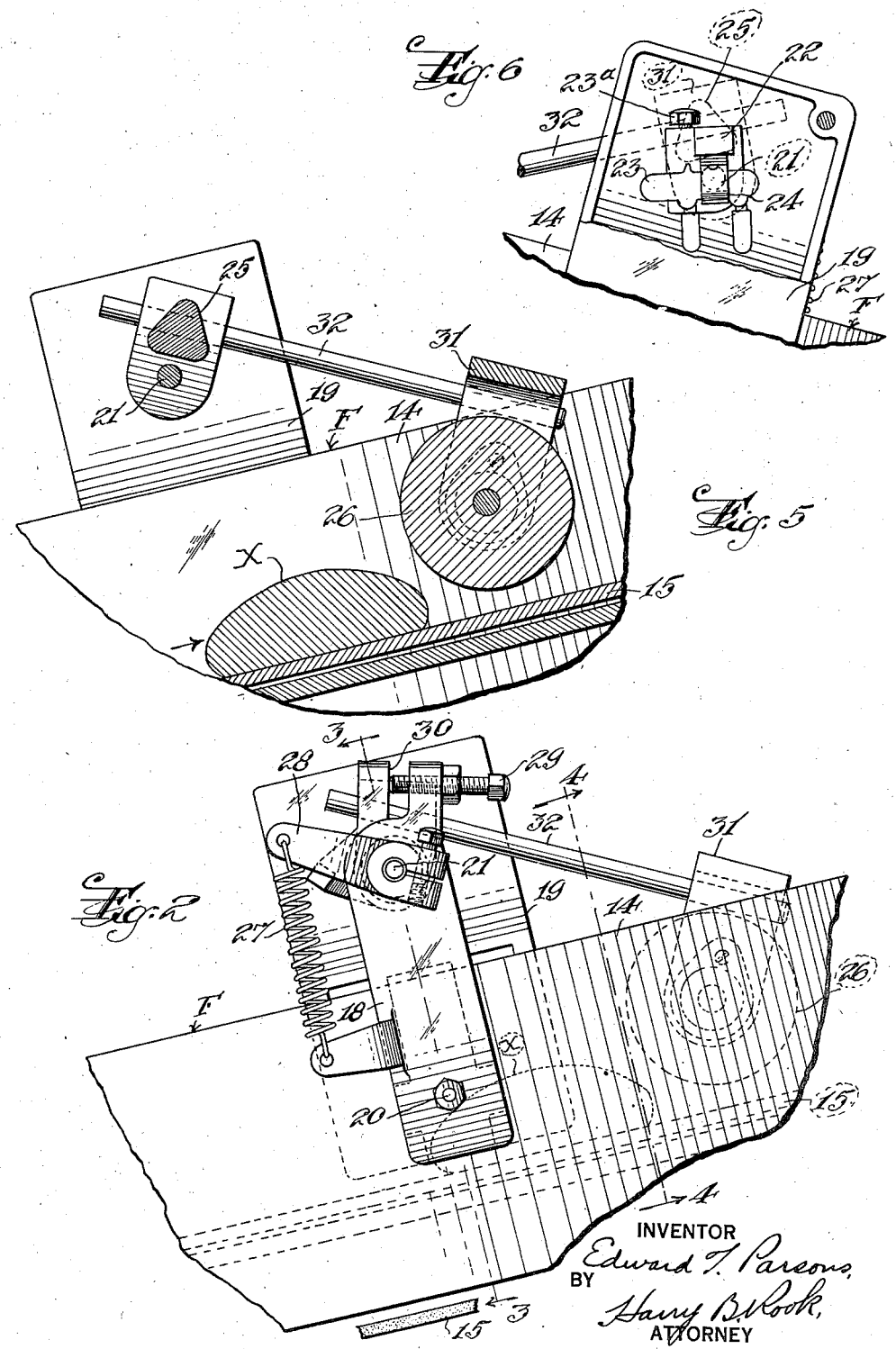
Figure 2 is an enlarged side elevation of the electric switch actuating mechanism.
Figure 3:
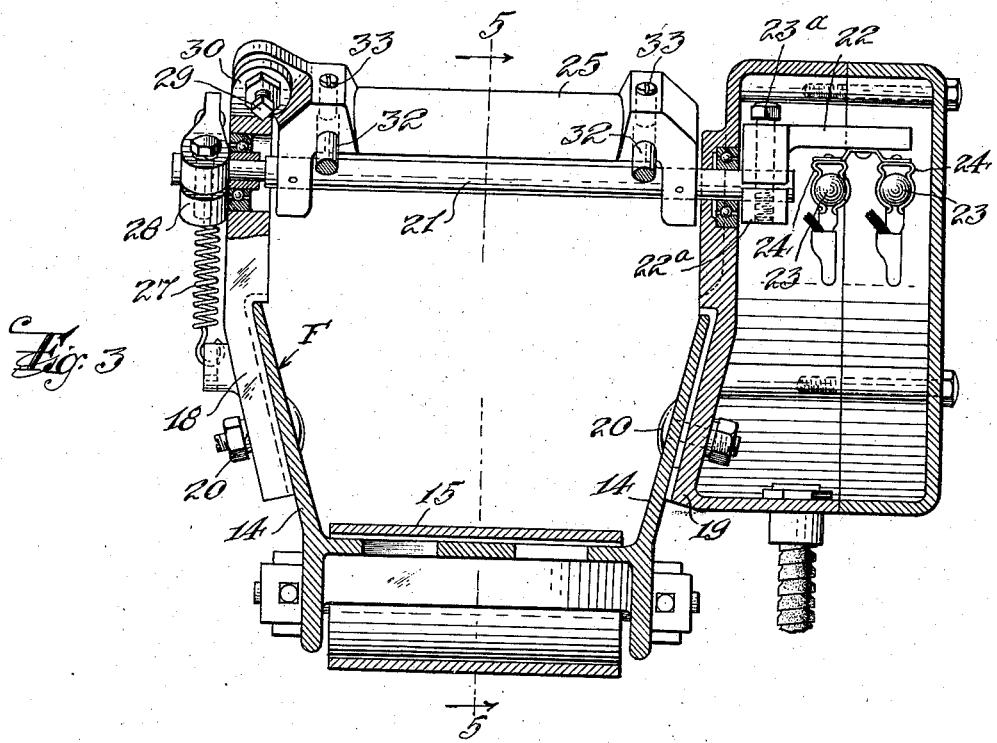
Figure 3 is a transverse sectional view on the line 3—3 of Figure 2.
Figure 4:
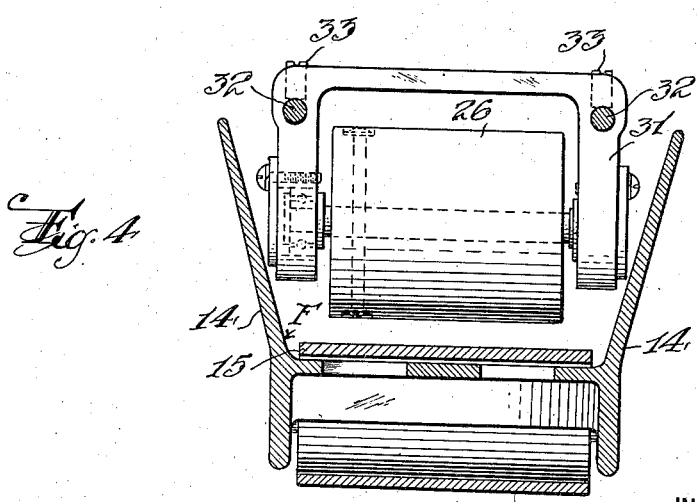
Figure 4 is a transverse sectional view on the line 4—4 of Figure 2.

Specifically describing the illustrated embodiment of the invention, the reference character A designates a dough molding machine including a molding drum B and sheeting rollers C. The drum and sheeting mechanism have surfaces to be contacted with dough during the working of the dough, and dusting mechanisms D and E are provided for the sheeting mechanism and the molding drum, respectively, to supply flour to the surfaces for preventing sticking of the dough thereon and to form a skin on the dough. Each of the dusting mechanisms includes a hopper 1 having a perforate bottom 2 and agitator mechanism 3 which includes a shaft 4 journaled in and projecting from one end of the hopper and carrying a crank arm 5, all as shown for example in Patent No. 1,548,279. The dusting mechanisms are mounted on the frame of the molding machine by brackets 6 and 7 respectively, so as to deposit flour on the respective sheeting mechanism and molding drum.

The bracket 7 includes a platform 8 on which is mounted an electric motor 9 to which is connected a speed reducing gearing 10 of known construction, the low speed shaft 11 of which carries a wrist pin 12 to which one end of each of actuating links 13 is connected. The other ends of the links 13 are connected to the crank arms 5 of the respective duster mechanisms so that upon operation of the motor the shafts 4 of the agitator mechanisms will be operated to discharge flour from the respective hoppers.

For feeding lumps or pieces of dough to the sheeting mechanism, I have shown a sheeting mechanism F of the type for example as shown in Patent No. 1,801,286, including a frame having side pieces 14 between which is mounted an endless belt 15 on rollers 16 and 17 which are journaled in the frame. This conveyor belt 15 is driven in the direction of the arrows from the driving mechanism of the dough molding machine (not shown). The lumps of dough to be operated upon are dropped upon the upper reach of the conveyor belt at the outer end thereof and conveyed along a predetermined path to the other end of the conveyor and then dropped by gravity to the sheeting rollers C where the dough lumps are formed into sheets which are subsequently coiled into a spiral roll and then deposited between the molding drum and a compression plate (not shown).

In accordance with the invention the operation of the motor 9 is controlled by the lumps of dough as they are carried on the conveyor, and specifically the motor is started and stopped automatically as each lump passes a predetermined point in advance of the sheeting rolls so that the dusting mechanism is operated only when a lump of dough is about to pass to the sheeting rolls. For accomplishing this result I have shown a switch actuating mechanism G for controlling the circuit to the motor 9, said mechanism including a pair of brackets 18 and 19 which are secured by bolts 20 on the side pieces 14 of the conveyor frame. A rocker shaft 21 is journaled in said brackets above and extends transversely of the conveyor. At one end of the rocker shaft 21 is a switch support 22 on which are mounted two mercury switches 23, each in a spring bracket 24. The support 22 is adjustable coaxially with the shaft 21 to vary the angular relation of the switches and the shaft; for example the support may have a split collar 22a embracing the shaft and clamped in position by a screw 23a. These two switches are shown as connected in a polyphase alternating current circuit in series with the motor 9 so as to control the supply of electricity from the supply line L to the motor, and one switch is connected in each of two of the three wires of the circuit. However, it should be understood that any suitable electric circuit, single or multi-wire, alternating or direct current, may be used with any suitable number of switches 23.

On the rocker shaft 21 is mounted a rocker 25 which carries an actuator in the form of a roller 26 that is normally influenced by action of gravity into the path of movement of the lumps of dough on the conveyor so as to be momentarily engaged by each lump and actuated to tilt the rocker in one direction. The action of gravity on the actuator 26 is counterbalanced by tension spring 27 connected between the bracket 18 and an arm 28 connected to the rocker shaft. The parts are so related that when the actuator roller 26 is in its normal position in the path of movement of the lumps of dough, the rocker is tilted to open the circuit through the switches 23, while when a lump of dough X is passing beneath the actuator roller, the rocker is tilted in the other direction to close the circuit through the switches. To adjust the position of the actuator roller 26 with respect to the conveyor, for example to ensure proper operation of the switches by the lumps, the rocker 25 has a set screw 29 to engage a stop lug 30 on the bracket 18; and the switches 23 may be correspondingly adjusted by adjustment of the support 22 on the shaft 21.

With this construction, it will be observed that normally when no pieces of dough are passing on the conveyor beneath the actuator 26, the motor 9 and duster mechanisms D and E will be stationary, and as each lump engages and disengages the actuator, the motor will be successively started and stopped. Accordingly, the duster mechanisms will be momentarily operated as each lump of dough passes beneath the actuator 26 and will be stationary at all other times.

The actuator roller may be mounted on the rocker in any suitable manner but as shown is journaled between the arms of an inverted U-shaped yoke 31 which is slidably mounted on rods 32 that are in turn slidable in the rocker 25, set screws 33 being provided for securing the rods 32 in the yoke 31 and rocker 25 in the desired adjusted position.

While I have shown and described the invention as embodied in certain details of construction and as used in connection with a certain type of machine, many modifications and changes in the details of construction and many other uses of the invention will occur to those skilled in the art as within the scope of the invention.

Having thus described my invention, what I claim is:

1. A machine of the character described comprising means for causing movement of a piece of material to be operated upon along a predetermined path, electrically operated means for supplying material at a predetermined point in said path for further treatment of said piece, an electric switch for controlling said electrically operated means, and an actuator for said switch including an element yieldingly disposed in the path of movement of said piece to hold said switch normally open and to be momentarily engaged by said piece for momentarily closing said switch as said piece passes said actuator.

2. A machine of the character described comprising means for causing movement of a piece of material to be operated upon along a predetermined path, electrically operated means for supplying material at a predetermined point in said path for further treatment of said piece, an electric switch adapted to be opened and closed by tilting thereof for controlling said electrically operated means, a tiltable support for said switch normally influenced to hold the switch open, and an element operatively connected to said support and yieldingly disposed in the path of movement of said piece to be momentarily engaged by the piece for momentarily tilting said support to close said switch as said piece passes said element.

3. In a dough working machine, cooperating parts having surfaces for contact with dough, means for directing dough to said surfaces, means for dusting flour upon said surfaces, and means in advance of said surfaces and actuated by passage of dough to said surfaces for controlling said dusting means.

4. In a dough working machine, cooperating parts having surfaces for contact with dough, means for directing lumps of dough in succession to said surfaces, means for dusting flour on said surfaces, and control means for said dusting means including an actuator in the path of movement of said lumps in advance of said surfaces for starting and stopping said dusting means upon engagement and disengagement respectively of each of said lumps with said actuator as said lump passes the actuator.

5. In a dough working machine, cooperating parts having surfaces for contact with dough, means for directing lumps of dough in succession to said surfaces, means for dusting flour on said surfaces including an electric motor, an electric switch for controlling said motor, and an actuator for said switch including an element in the path of movement of said lumps in advance of said surfaces for normally holding said switch open and to be momentarily engaged by each lump as it passes said element for momentarily closing said switch to start said motor.

6. In a dough working machine, cooperating parts having surfaces for contact with dough, means for directing lumps of dough in succession to said surfaces, means for dusting flour on said surfaces including an electric motor, an electric switch adapted to be opened and closed by tilting thereof for controlling said motor, a tiltable support for said switch normally influenced to hold the switch open, and an element operatively connected to said support and yieldingly disposed in the path of movement of said lumps to be momentarily engaged by each lump for momentarily tilting said support to close said switch as said lump passes said element.

7. In a dough working machine, cooperating parts having surfaces for contact with dough, a feeding conveyor including a frame for feeding lumps of dough in succession to said surfaces, flour dusting mechanism including a motor for supplying flour to said surfaces, means for controlling starting and stopping of said motor including a tiltable member on said frame normally influenced to stop said motor, and an actuator yieldingly disposed in the path of movement of said lumps on said conveyor to be momentarily engaged by each lump and tilt said member to start said motor as said lump passes said actuator.

8. In mechanism of the character described means including a frame for conducting pieces of material along a predetermined path in succession, a rocker journaled on said frame transversely of said path and having an actuator, electric switch mechanism mounted on said rocker, and means normally influencing said rocker into a position to open said switch and yieldingly hold said actuator in said path to be momentarily engaged by each said piece to oscillate said rocker as said piece passes said actuator for momentarily closing said switch.

9. In mechanism of the character described, means including a frame for conducting pieces of material along a predetermined path in succession, a pair of bearing brackets on said frame one at each side of said path, a rocker journaled in said brackets above said path and having an actuator, and an electric switch mounted on said rocker to be opened and closed by oscillation of said rocker, said actuator and rocker being normally influenced by gravity to hold said switch open and locate said actuator in the path of movement of said lumps to be momentarily engaged by each lump as it passes said actuator to oscillate said rocker and momentarily close said switch.

10. In mechanism of the character described, means including a frame for conducting pieces of material along a predetermined path in succession, a pair of bearing brackets on said frame one at each side of said path, a rocker journaled in said brackets above said path and having an actuator, and an electric switch mounted on said rocker to be opened and closed by oscillation of said rocker, said actuator and rocker being normally influenced by gravity to hold said switch open and locate said actuator in the path of movement of said lumps to be momentarily engaged by each lump as it passes said actuator to oscillate said rocker and momentarily close said switch and spring means for yieldingly counterbalancing the effect of gravity on said rocker and actuator.

11. In a dough working machine, cooperating parts having surfaces for contact with dough, means for directing lumps of dough in succession to said surfaces, means for dusting flour on said surfaces, and automatic means for successively starting and stopping said dusting means as each lump passes a predetermined point in advance of said surfaces.

12. A machine of the character described comprising means for causing movement of a piece of material to be operated upon along a predetermined path, electrically operated means for supplying material at a predetermined point in said path for further treatment of said piece, and means at a point in said path in advance of the electrically operated means including a normally open switch connected in circuit with said electrically operated means and an actuator for said switch adapted to be momentarily engaged and actuated by said piece as the piece moves along said path to momentarily close said switch to operate said electrically operated means.

EDWARD T. PARSONS.